United States Patent [19]
Roth

[11] 4,267,861
[45] May 19, 1981

[54] PLURAL MODULAR FLUID TRANSFER VALVES

[75] Inventor: Verlon C. Roth, Pasadena, Calif.

[73] Assignee: RK Industries, Ontario, Calif.

[21] Appl. No.: 90,906

[22] Filed: Nov. 5, 1979

[51] Int. Cl.³ .......................... F16K 1/32; F16K 27/02
[52] U.S. Cl. ................................. 137/625.48; 251/63;
251/324; 251/367
[58] Field of Search .................. 137/625.48; 251/367,
251/324, 63

[56] References Cited

U.S. PATENT DOCUMENTS

| | | | |
|---|---|---|---|
| 3,532,122 | 10/1970 | Bienzeisler | 251/367 X |
| 4,145,025 | 3/1979 | Bergeron | 251/63 |

Primary Examiner—Arnold Rosenthal
Attorney, Agent, or Firm—J. L. Jones, Sr.

[57] ABSTRACT

Fluid transfer valves having a first and a second actuating means are functionally assembled from a common valve housing having coaxial aligned opposed inlet and outlet ports and a hollow cylindrical interior having four stepped bores, concentrically aligned on a housing cylindrical symmetry axis. A cylindrical sealing solid piston is disposed in the cylindrical deep bore of the housing. A concentric bore in the screw cap secures and provides a close linear alignment path for the sealing solid piston. The cap has multiple concentric radial apertures disposed in an interior integral cap collar, providing a flow path for fluid transfer. A concentric piston channel uniformly disposed in and around the axis of symmetry of the piston provides fluid transfer through the valve on controlled positioning of the piston. A first aperture connects the inlet port to the annular bore surrounding the piston, and a second aperture can connect the outlet port to the piston channel.

Concentric O-rings are secured in O-ring channels in the housing hollow interior and on the sealing piston exterior, providing the sealing of the fluid flow path through the valve in any piston position. The fluid transfer is controlled by slidably positioning the sealing solid piston. A three-way valve is provided by modifying the sealing solid piston and housing, providing two separately spaced piston channels on a slidable sealing piston.

14 Claims, 9 Drawing Figures

U.S. Patent     May 19, 1981     4,267,861
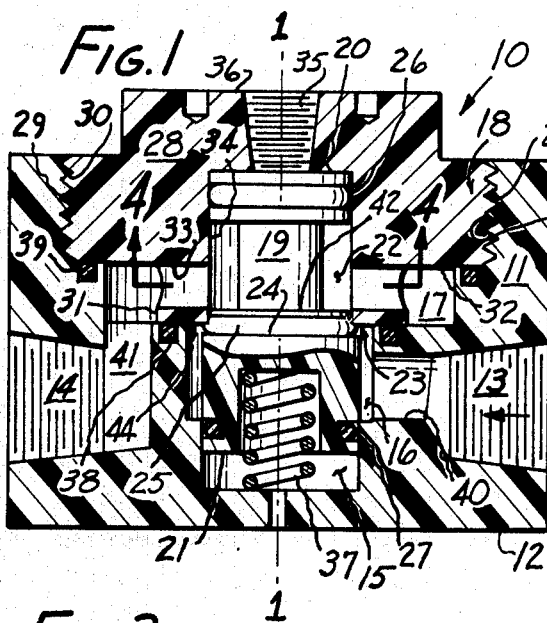
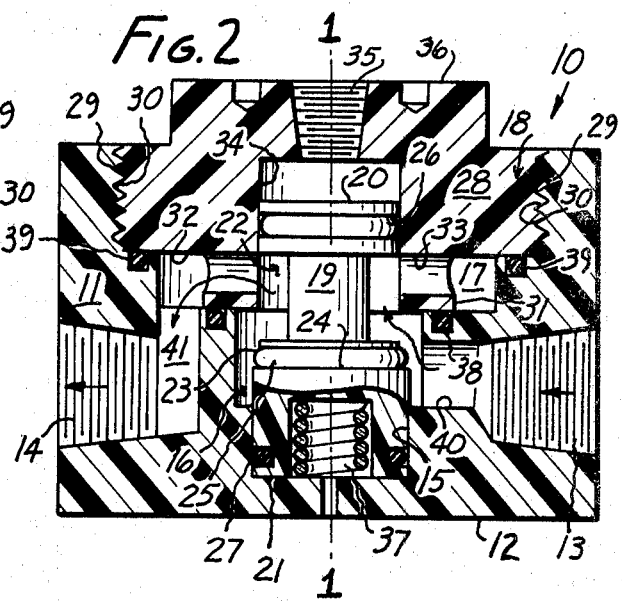
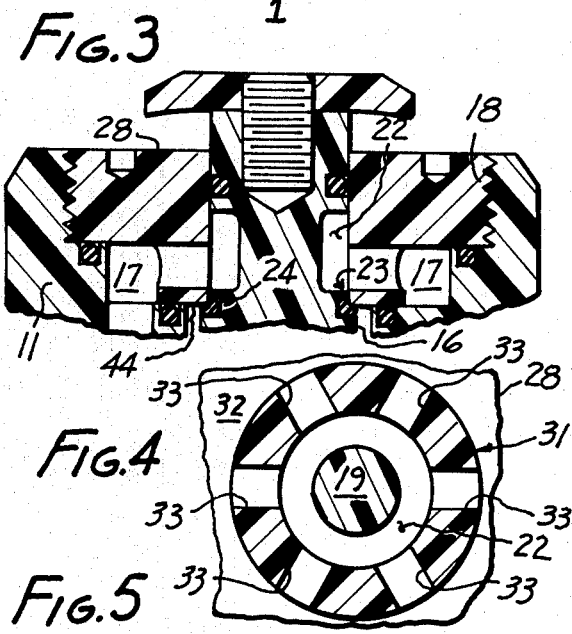
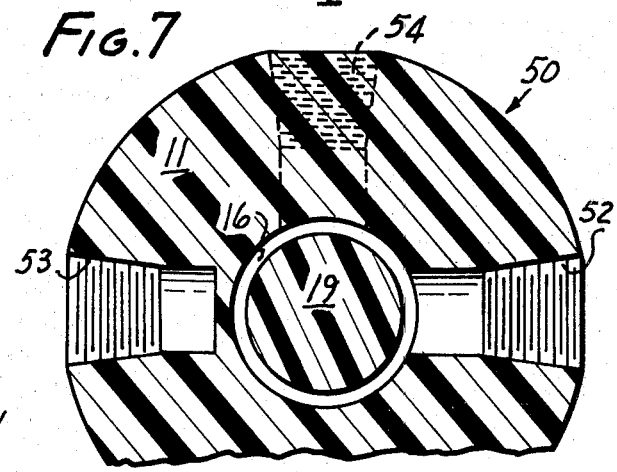
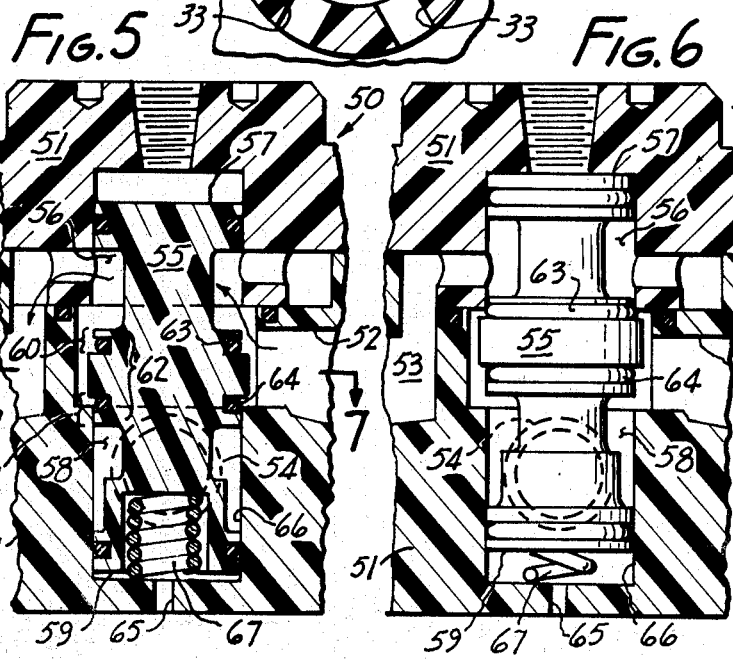
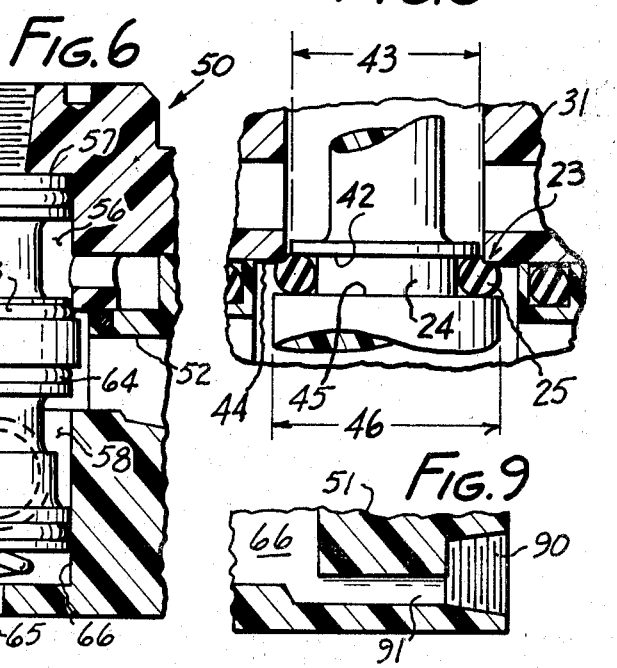

PLURAL MODULAR FLUID TRANSFER VALVES

CROSS-REFERENCE TO RELATED APPLICATION

Reference is made to the proposed copending U.S. patent application titled MODULAR FLUID PRESSURE REGULATOR VALVES, invented by Verlon C. Roth, whose residence is in Azusa, Calif.

BACKGROUND OF THE INVENTION

This fluid transfer valve relates to simple, economical fluid valves suitable for controlling fluid flow in assorted industrial and residential applications. One modification of this improved valve is a two-way on-off valve which is simple to install coaxially in a fluid flow line. A second modification of this valve provides a simple three-way valve which diverts fluid flow from a first outlet port to a second outlet port on valve actuation.

Davis, in U.S. Pat. No. 4,067,348 issued Jan. 10, 1978, discloses and claims a fuel shut-off valve having a body with a cylindrical bore divided into a first and second section by an annular tapered shoulder. A piston is slidably positioned in the bore and includes O-ring that seats against the tapered shoulder to isolate the first and second sections of the bore.

Lee, in U.S. Pat. No. 3,713,458 issued Jan. 23, 1973, discloses and teaches an explosively-actuated valve having a cylindrical valve casing interior and a slidable spool positioned therein, the spool having a fluid transfer channel which is normally opened. An explosive charge positioned in one end of the casing can be actuated to cut off fluid flow through the fluid transfer channel.

Baker, in U.S. Pat. No. 3,064,676 issued Nov. 20, 1962, discloses and claims a hydraulic flow control valve having a valve housing chamber with two selected chamber cylindrical diameters.

Reynolds disclosed and claimed a gas pressure operated trip valve in U.S. Pat. No. 2,889,132, issued June 2, 1959. A valve body has a cylindrical chamber and a piston secured in the chamber. The valve is normally open, and is closed by gas pressure actuation.

SUMMARY OF THE INVENTION

A fluid transfer valve combination comprises a rigid plastic composition valve housing having a base and a coaxial aligned opposed inlet port and outlet port, and a hollow cylindrical interior having four stepped concentric cylindrical bores. The concentric bores comprise a deep base bore, a fluid transfer bore disposed above the deep base bore, an outlet base bore disposed above the transfer bore, and a screw cap retainer bore disposed above the outlet base bore. Each one of the stacked four concentric bores have a successively larger selected bore diameter on serially proceeding from the deep base bore to the screw cap retainer bore. A cylindrical sealing solid piston has a first flat piston end face and an opposed second flat piston end face, and has at least one diametrically concentric fluid transfer channel disposed in and circumferentially around the piston cylindrical axis adjacent to the first piston end face. The piston has a circumferential sealant shoulder disposed on the channel wall opposed to the first flat piston end face. The sealant shoulder provides sealant surface, sealing fluid flow when properly positioned. Plural sealing O-rings are disposed in O-ring sealing channels concentrically disposed adjacent to the first and second flat piston end faces and the at least one concentric fluid transfer channel, providing slidable fluid sealants on the piston.

A cylindrical screw cap has concentric screw threads, and is secured in the hollow cylindrical valve housing interior, mating with the screw threads of the screw cap retainer bore. An interior integral cap collar is secured to the screw cap interior face and has multiple concentric radial apertures providing a connecting fluid flow path to a concentric cap bore disposed in the screw cap. The cap bore is diametrically sized to provide a close slidable linear alignment path for the slidable sealant of the first flat piston face, and a mating sealant shoulder for the piston shoulder.

A first actuating means is secured conductively to the valve housing face adjacent to the first piston end face and is disposed to cooperatively actuate on the first piston end face. A second actuating means is secured conductively to the valve housing face adjacent to the second piston end face and is disposed to cooperatively actuate on the second piston end face. One sealing O-ring is disposed in an O-ring channel concentrically disposed in the base of said outlet base bore adjacent to the fluid transfer bore, providing a fluid transfer seal. One sealing O-ring is disposed in an O-ring channel concentrically disposed in the base of the screw cap retainer bore, providing a fluid transfer seal. A first internal fluid port conductively connects the inlet port to the fluid transfer bore. A second internal fluid port is disposed in the base of the screw cap retainer bore connecting conductively the outlet base bore to the outlet port.

Actuating the first actuating means positions the first piston end face of the piston in an open valve position, providing an open fluid transfer path from inlet port, through the first internal fluid port, through the concentric fluid transfer channel disposed in and around the piston axis, through the fluid transfer bore, through the outlet base bore, through the second internal fluid port and through the outlet port. Actuating the second actuating means positions the second piston end face in a closed valve position, positioning the piston in a sealing position, closing the at least one piston fluid transfer channel to fluid flow.

A fluid transfer diverter valve combination has the same valve housing as above described modified by a coaxial aligned opposed inlet port and a first outlet port, and a second outlet port angularly disposed below the coaxial ports. The cylindrical sealing solid piston has a first and second adjacent equal volume pair of channels, the first channel being disposed adjacent to the first flat piston end face and the second channel being disposed adjacent to the second flat piston end face. The piston has first and second circumferential shoulders oppositely disposed on the pair of edges of the channel wall separating the first channel and the second channel, the first and second shoulders being suitable for alternately sealing fluid flow to the respective first and the second outlet ports.

Actuating the second actuating means positions second piston end face in a second valve position, positioning the second channel of piston in a conducting position, opening the piston fluid transfer second channel to fluid flow, and to fluid flow through the second outlet port.

Included in the objects of this invention are:

To provide a moderate cost, simple two-way transfer valve having coaxial input and output ports.

To provide a moderate cost valve housing which can be assembled into several total valve modifications.

To provide a plastic valve combination which can be resistant to corrosive fluid flow.

To provide a plastic valve combination which separately seals an actuating spring means from the fluid flow in the valve.

To provide valve combination components which are easily fabricated in simple machine shop operations on lathes and the like.

To provide a valve combination which can operate utilizing a variety of first and second actuating means combinations.

To provide a three-way diverter valve combination embodying a modified two-way valve housing.

To provide a simple O-ring sealing shoulder on a slidable piston, providing a simple fluid flow sealant.

Other objects and advantages of this invention are taught in the following description and claims.

BRIEF DESCRIPTION OF THE DRAWINGS

The description of this invention is to be read is conjunction with the following drawings:

FIG. 1 is a mid-sectional, partial perspective, elevational view of a two-way modular fluid transfer valve of this invention, in a closed valve position.

FIG. 2 is a partial perspective, elevational cross sectional view of the two-way valve of FIG. 1, open to fluid flow.

FIG. 3 is an elevational, cross sectional partial view of a modification of the valve of FIG. 2, illustrating a manually operated first actuating means.

FIG. 4 is a sectional slice through 4—4 of the two-way transfer valve of FIG. 1, illustrating the multiple fluid flow paths to the concentric cap bore.

FIG. 5 illustrates the three-way diverter valve modification disposed open to fluid flow, shown in partial cross-sectional elevational view.

FIG. 6 is another cross-sectional illustration of the transfer valve of FIG. 5, modified to illustrate the second three-way piston position.

FIG. 7 illustrates a cross-sectional view through 7—7 of FIG. 5.

FIG. 8 illustrates a detailed view of the O-ring sliding sealing shoulder disposed on the slidable sealing piston.

FIG. 9 illustrates the detail of the compressed gas inlet port.

DESCRIPTION OF THE PREFERRED EMBODIMENT OF THE INVENTION

Referring to FIGS. 1, 2, 4 and 7 together in detail, a fluid transfer valve combination 10 comprises a rigid plastic composition valve housing 11 having a base 12 and a coaxial 7—7 aligned opposed inlet port 13 and outlet port 14, and a hollow cylindrical interior having four stepped concentric cylindrical bores. The concentric bores comprise a deep base bore 15, a fluid transfer bore 16 disposed above the deep base bore, an oulet base bore 17 disposed above the transfer bore 16, and a screw cap retainer bore 18 disposed above the outlet base bore 17. Each one of the stacked four concentric bores 15, 16, 17, 18 have a successively larger selected bore diameter on serially proceeding from the deep base bore to the screw cap retainer bore. A cylindrical sealing solid piston 19 has a first flat piston end face 20 and an opposed second flat piston end face 21, and has at least one diametrically concentric fluid transfer channel 22 disposed in and circumferentially around the piston cylindrical axis 1—1 adjacent to the first piston end face 21. The piston has a circumferential sealant shoulder 23 disposed in the channel 24 opposed to the first flat piston end face 21. The sealant shoulder 23 provides O-ring sealant surface 25, sealing fluid flow when properly positioned. Plural sealing O-rings 26, 27 are disposed in O-ring sealing channels concentrically disposed adjacent to the respective first and second flat piston end faces 20 and 21 and the at least one concentric fluid transfer channel 22, providing slidable fluid sealants on the piston 19.

A cylindrical screw cap 28 has external concentric screw threads 29, and is secured in the hollow cylindrical valve housing interior, mating with the screw threads 30 of the screw cap retainer bore 18. An interior integral cap collar 31 is secured to the screw cap interior face 32 and has multiple concentric radial apertures 33 providing a connecting fluid flow path to a concentric cap bore 34 disposed in the screw cap 28. The cap bore 34 is sized to provide a close slidable linear alignment path for the slidable sealant 26 of the first flat piston face 20, and a mating sealant shoulder 23 for the piston 19.

A first actuating means 35 is secured conductively to the valve housing face 36 adjacent to the first piston end face 20 and is disposed to cooperatively actuate on the first piston end face 20. A second actuating means 37 is secured conductively to the valve housing face adjacent to the second piston end face 21 and is disposed to cooperatively actuate on the second piston end face 21. One sealing O-ring 38 is disposed in an O-ring channel concentrically disposed in the base of said outlet base bore ajdacent to the fluid transfer bore 16, providing a fluid transfer seal. One sealing O-ring 39 is disposed in an O-ring channel concentrically disposed in the base of the screw cap retainer bore 18, providing a fluid transfer seal. A first internal fluid port 40 conductively connects the inlet port 13 to the transfer bore 16. A second internal fluid port 41 is disposed in the base of the screw cap retainer bore 18 connecting conductively the outlet base bore 17 to the outlet port 14.

Actuating the first actuating means 35 positions the first piston end face 20 of the piston 19 in an open valve position, as in FIG. 2, providing an open fluid transfer path from inlet port 13, through the first internal fluid port 40, through the concentric fluid transfer channel 22 disposed in and around the piston axis 1—1, through the fluid transfer bore 16, through the outlet base bore 17, through the second internal fluid port 41 and through the outlet port 14. Actuating the second actuating means 37 positions the second piston end face 21 in a closed valve position, as in FIG. 1, positioning the piston 19 in a sealing position, closing the at least one piston fluid transfer channel 22 to fluid flow.

Referring in detail to FIGS. 5, 6, 7 and 9, the fluid transfer three-way diverter valve 50 combination has a similar overall valve housing 51 as above described, modified by a coaxial aligned 7—7 opposed inlet port 52 and a first outlet port 53, and a second outlet port 54 angularly disposed below the coaxial ports. See FIG. 7. The cylindrical sealing solid piston 55 has a first and second adjacent equal volume pair of channels, the first channel 56 being disposed adjacent to the first flat piston end face 57 and the second channel 58 being disposed adjacent to the second flat piston end face 59. See FIGS. 5 and 6. The piston has first 60 and second 61 circumferential shoulders oppositely disposed on the pair of edges of the channel wall 62 separating the first channel 56 and the second channel 58, the first 60 and second 61 shoulders being suitable for alternately sealing fluid flow to the respective first 53 and the second 54 outlet ports, with the respective O-rings 63 and 64.

Actuating the second actuating means 67 positions (FIG. 6) the second piston end face 59 in a second valve position, positioning the second channel 58 of piston 55 in a conducting position, opening the piston fluid transfer second channel 58 to fluid flow, and to fluid flow through the second outlet port 54. Air leak outlet 65 allows air to leak from deep base bore.

FIG. 8 illustrates in greater detail and inventive advance in this simple cut-off valve modification in which the circumferential sealant shoulders 23, 60, 61 and the like, have an O-ring sealant 25 and the like disposed in an O-ring circumferential O-ring channel 24 and the like. Sealant 25 is disposed against a first channel wall 42 whose diameter is a selected value 43 which is adapted to provide a flexible O-ring sealant 25 against the integral cap collar 31 adjacent to the collar base 44. Sealant 25 is disposed against an opposed second channel wall 45 whose diameter 46 is larger than channel wall 42 and provides a mechanical stop against collar base 44. Basically, an O-ring sealant is disposed and secured in an O-ring channel. One wall of the above channel is disposed adjacent to at least one fluid flow channel and has a selected wall diameter adapted and sized to provide an O-ring sealant continuous contact pressure against a sealant surface of a fluid flow bore on actuating a means operating the solid piston.

Referring to FIG. 9, the detail illustrates a compressed gas inlet port 90 in the valve housing 51, port 90 being conductively connected to the gas aperture 91, which in turn connects to the deep base bore 66. Compressed gas, at a regulated pressure, can be utilized in the port 90, aperture 91, and deep base bore 66 to actuate the piston 55 or the like. The air leak outlet 65 is then to be eliminated. The details of FIG. 8 can be incorporated in a selected valve, providing compressed gas operation of a piston 55 or 19 or the like, instead of utilizing a spring actuating means 37, 67 or the like.

A major advantage of this invention is the provision of sealing O-ring sealing means which securely separate the first and second valve actuating means from corrosive fluids and the like, which can be cut off and diverted by the valves.

The screw cap 28 has external screw threads 29, and the screw cap bore 18 has internal screw threads 20, but the threads on the components can be obviously reversed. The cap 28 can be equivalently designed to have external threads and the screw cap bore can be designed to seal with internal screw threads.

Normally the valves of this invention operate over a pressure range of 0 to 125 psi, but the components can be designed to withstand and operate at higher pressure values to 500 psi and the like. Typical compositions useful in component constuction can be polypropylene plastic, rigid polyvinyl chloride plastic, polytetrafluoroethylene plastic, brass, aluminum, and the like, providing moderate cost raw materials and manufacturing costs.

Since the same basic valve housing 11 and the like can be utilized in fabricating the modular valves of this invention, the manufacture of an array of valve models is facilitated.

Many modifications in the fluid transfer valves can be made in the light of my teachings. It is understood that within the scope of the claims, the invention can be practiced otherwise than as described.

I claim:

1. A fluid transfer valve combination comprising:

a rigid composition valve housing having a base and a coaxial aligned opposed inlet port and outlet port, and a hollow cylindrical interior having four stepped concentric cylindrical bores, said concentric bores comprising a deep base bore, a fluid transfer bore disposed above said deep base bore, an outlet base bore disposed above said transfer bore, and a screw cap retainer bore having screw threads disposed above said outlet base bore, each one of the stacked aforesaid concentric bores having a successively larger selected bore diameter on serially proceeding from said deep base bore to said screw cap retainer bore;

a cylindrical sealing solid piston having a first flat piston end face and an opposed second flat piston end face, and having at least one diametrically concentric fluid transfer channel disposed in and circumferentially around the piston cylindrical axis ajdacent to said first piston end face, said piston having a circumferential sealant shoulder disposed on the channel wall opposed said first flat piston end face, said shoulder suitable for sealing fluid flow;

plural sealing O-rings disposed in O-ring sealing channels each one of said O-rings separately concentrically disposed adjacent said first and second flat piston end faces and said at least one concentric fluid transfer channel, providing slidable fluid sealants on said piston;

a cylindrical screw cap having concentric screw threads is secured in said hollow cylindrical valve housing interior, said screw threads mating with the screw threads of the screw cap retainer bore, an interior integral cap collar secured to the screw cap interior face has multiple concentric radial apertures providing a connecting fluid flow path to a concentric cap bore disposed in said screw cap and diametrically sized to provide a close slidable linear alignment path for the slidable sealant of said first flat piston face, and a shoulder mating with said piston circumferential shoulder;

a first actuating means secured conductively to a valve housing face adjacent a first piston end face and disposed to cooperatively actuate on said first piston end face;

a second actuating means secured conductively to a valve housing face adjacent a second piston end face and disposed to cooperatively actuate on said second piston end face;

one sealing O-ring disposed in an O-ring channel concentrically disposed in the base of said outlet base bore adjacent to said fluid transfer bore, providing a fluid transfer seal;

one sealing O-ring disposed in an O-ring channel concentrically disposed in the base of said screw cap retainer bore, providing a fluid transfer seal;

a first internal fluid port connecting conductively said inlet port to said fluid transfer bore; and, a second internal fluid port disposed in the base of said outlet base bore connecting conductively said outlet base bore to said outlet port;

whereby actuating said first actuating means positions said first piston end face of said piston in an open valve position, providing an open fluid transfer path from inlet port, through said first internal fluid port, through said concentric fluid transfer channel disposed around said piston axis, through said fluid transfer bore, through said outlet base bore, through said second internal fluid port and through said outlet port, and whereby actuating said second actuating means positions said second piston end face in a closed valve position, positioning said piston in a sealing position, closing said at least one piston fluid transfer channel to fluid flow.

2. In the valve combination set forth in claim 1, the further modification wherein
said valve housing,
said cylindrical solid piston, and,
said screw cap,
are a rigid plastic composition having the selected chemical and physical properties.

3. In the valve combination set forth in claim 1, the further modification wherein said valve housing, said cylindrical solid piston, and said screw cap are selected from the group of rigid composition consisting of polyvinyl choride, high density polyethylene, polypropylene, polycarbonate, and acrylonitrile-butadiene-styrene copolymer (ABS), polytetrafluoroethylene plastics.

4. In the valve combination set forth in claim 2, the further modification wherein
said first actuating means is an external manual handle extension permanently secured to said first piston end face, said handle extension actuable through said screw cap, and
said second actuating means is a compression loaded metal spring biased in an aperture disposed at said second piston end face.

5. In the valve combination set forth in claim 2, the further modification wherein
said first actuating means has an actuating body of compressed gas having a pressure value suitable for moving said first piston end face; and,
said second actuating means is a compression loaded metal spring biased in an aperture disposed at said second piston end face.

6. In the valve combination set forth in claim 2, the further modification wherein
said first actuating means has an actuating body of compressed gas having a pressure value suitable for moving said first piston end face,
said second actuating means has an actuating body of compressed gas having a pressure value suitable for moving said second piston end face.

7. In the valve combination set forth in claim 2, the further modification wherein
said first actuating means and said second actuating means have electric solenoid means adaptively secured to one of said first and second piston faces, linearly moving said piston on electrical signal.

8. A fluid transfer diverter valve combination comprising:
a rigid plastic composition valve housing having a base and a coaxial aligned opposed inlet port and a first outlet port, and a second outlet port, and a hollow cylindrical interior having four stepped concentric cylindrical bores, said concentric bores comprising at least a deep base bore, a fluid transfer bore disposed above said deep base bore, an outlet base bore disposed above said transfer bore, and a screw cap retainer bore having screw threads disposed above said outlet base bore, each one of the stacked aforesaid concentric bores having a successively larger selected bore diameter on serially proceeding from said deep base bore to said screw cap retainer bore, and said second outlet port radially angularly disposed relative to said first outlet port and disposed off center of said coaxial aligned inlet port and said first outlet port;

a cylindrical sealing solid piston having a first flat piston end face and an opposed second flat piston end face, and having a first and second adjacent equal volume diametrically concentric pair of fluid transfer channels disposed in and circumferentially around the piston cylindrical axis adjacent to the opposed piston end faces, said first channel disposed adjacent said first flat piston end face, and said second channel disposed adjacent said second flat piston end face, said piston having first and second circumferential shoulders oppositely disposed on the pair of edges of a channel wall separating said first channel and said second channel, said first and second shoulders suitable for alternately sealing fluid flow to said respective first and said second outlet ports, said piston having a rigid plastic composition;

plural sealing O-rings disposed in O-ring sealing channels concentrically disposed adjacent said first and second flat piston end faces and said first and said second concentric fluid transfer channels, providing slidable fluid sealants on said piston first and second fluid channels;

a cylindrical screw cap having concentric screw threads is secured in said hollow cylindrical valve housing interior, mating with the screw threads of the screw cap retainer bore, an interior integral cap collar secured to the screw cap interior face has multiple concentric radial apertures providing a connecting fluid flow path to a concentric cap bore disposed in said screw cap and diametrically sized to provide a close slidable linear alignment path for the slidable sealant of said first flat piston face;

a first actuating means secured conductively to a valve housing face adjacent a first piston end face and disposed to cooperatively actuate on said first piston end face;

a second actuating means secured conductively to a valve housing face adjacent a second piston end face and disposed to cooperatively actuate on said second piston end face;

one sealing O-ring disposed in an ring channel concentrically disposed in the base of said outlet base bore adjacent to said fluid transfer bore, providing a fluid transfer seal;

one sealing O-ring disposed in an O-ring channel concentrically disposed in the base of said screw cap retainer bore providing a fluid transfer seal;

a first internal fluid port connecting conductively said inlet port to said fluid transfer bore; and, a second internal fluid port disposed in the base of said outlet base bore connecting conductively said outlet base bore to said outlet port;

whereby actuating said first actuating means positions said first piston end face of said piston in a first valve position, providing an open fluid transfer path from inlet port, through said first internal fluid port, through said concentric fluid transfer channel disposed around said piston axis, through said fluid transfer bore, through said outlet base bore, through said second internal fluid port and through said first outlet port, and whereby actuating said second actuating means positions said second piston end face in a second valve position, positioning said second channel of said piston in a conducting position, opening said at least piston fluid transfer second channel to fluid flow, and to fluid flow through said second outlet port.

9. In the fluid transfer diverter valve combination of claim 8, the further modification where said valve housing, said cylinder solid piston, and said screw cap are selected from the group of rigid combinations consisting of polyvinyl chloride, high density polyethylene, polypropylene, polycarbonate, and acrylonitrile-butadiene-styrene copolymer (ABS), polytetrafluoroethylene plastics.

10. In the valve combination set forth in claim 8, the further modification wherein said first actuating means is an external manual handle extension permanently secured to said first piston end face, said handle extension actuable through said screw cap, and said second actuating means is a compression loaded metal spring biased in an aperture disposed at said second piston end face.

11. In the valve combination set forth in claim 8, the further modification wherein said first actuating means has an actuating body of compressed gas having a pressure value suitable for moving said first piston end face; and, said second actuating means is a compression loaded metal spring biased in an aperture disposed at said second piston end face.

12. In the valve combination set forth in claim 8, the further modification wherein said first actuating means has an actuating body of compressed gas having a pressure value suitable for moving said first piston end face, said second actuating means has an actuating body of compressed gas having a pressure value suitable for moving said second piston end face.

13. In the valve combination set forth in claim 8, the further modification wherein said first actuating means and said second actuating means have electric solenoid means adaptively secured to one of said first and second piston faces, linearly moving said piston on electrical signal.

14. A fluid transfer valve housing combination comprising:

a rigid plastic composition valve housing having a base and a coaxial aligned opposed inlet port and outlet port, and a hollow cylindrical interior having four stepped concentric cylindrical bores, said concentric bores comprising a deep base bore, a fluid transfer bore disposed above said deep base bore, an outlet base bore disposed above said transfer bore, and a screw cap retainer bore disposed above said outlet base bore, each one of the stacked aforesaid concentric bores having a successively larger selected bore diameter on serially proceeding from said deep base bore to said screw cap retainer bore;

one sealing O-ring disposed in an O-ring channel concentrically disposed in the base of said outlet base bore adjacent to said fluid transfer bore, providing a fluid transfer seal;

one sealing O-ring disposed in an O-ring channel concentrically disposed in the base of said screw cap retainer bore, providing a fluid transfer seal;

a first internal fluid port connecting conductively said inlet port to said fluid transfer bore; and, a second internal fluid port disposed in the base of said outlet base bore connecting conductively said outlet base bore to said outlet port.

* * * * *